United States Patent [19]

Schumann

[11] Patent Number: 5,147,622
[45] Date of Patent: Sep. 15, 1992

[54] METHOD FOR STABILIZING PHOSPHORUS TRICHLORIDE

[75] Inventor: Rudolf Schumann, Raguhn, Fed. Rep. of Germany

[73] Assignee: Chemie AG Bitterfeld-Wolfen, Bitterfeld, Fed. Rep. of Germany

[21] Appl. No.: 665,511

[22] Filed: Mar. 6, 1991

[51] Int. Cl.$^5$ ............................................. C01B 11/02
[52] U.S. Cl. ..................................... 423/265; 423/300
[58] Field of Search .................. 423/300, 301, 265; 252/399, 406, 182.32

[56] References Cited

U.S. PATENT DOCUMENTS 4,000,201 12/1976 Weinshenker ...................... 252/406
4,769,164 9/1988 Saloman ............................. 252/406

FOREIGN PATENT DOCUMENTS 61-27537 5/1986 Japan .

*Primary Examiner*—Michael Lewis
*Assistant Examiner*—Valerie Lund
*Attorney, Agent, or Firm*—Jordan and Hamburg

[57] ABSTRACT

The invention relates to a method for the stabilization of phosphorus trichloride, wherein one or more derivatives of dithiocarbamic acids are added to the phsophorus trichloride. As derivatives, salts, esters or thiuram sulfides of the dithiocarbamic acids, individually or as a mixture, are preferred. The amounts used generally fall within the range of $10^{-4}\%$ to $10^{-2}\%$, based on the amount of phosphorus trichloride. Derivatives, which are only slightly soluble in phosphorus trichloride are advantageously used in amounts of more than $10^{-2}\%$. Due to the inventive addition of derivatives of dithiocarbamic acids, the formation of phosphorus oxychloride in the phosphorus trichloride is delayed significantly and reduced to a minimum value.

14 Claims, No Drawings

# METHOD FOR STABILIZING PHOSPHORUS TRICHLORIDE

BACKGROUND OF THE INVENTION

The present invention relates to a method for stabilizing phosphorus trichloride.

Phosphorous trichloride is prepared industrially by the reaction of phosphorus with chlorine. It generally contains less than 0.05% phosphorus oxychloride, if it is prepared from purified chlorine, or if it is rectified when chlorine is used, which has not been purified.

However, phosphorus trichloride can easily be oxidized by oxygen or oxygen-containing gases to phosphorus oxychloride. A slow, steady increase in the phosphorus oxychloride content can be observed during storage, transport and use of phosphorus trichloride. The phosphorus oxychloride lowers the quality of the phosphorus trichloride and necessarily leads to undesirable by-products during chemical processing, so that the desired end product is of lower quality and is obtained in a lesser yield. For example, in further processing to phosphorus pentachloride or phosphorus sulfochloride, all the phosphorus oxychloride reaches the end product. Because of the physical properties, subsequent separation is much more difficult than separation from phosphorus trichloride. During further processing to phosphorous acid, phosphoric acid is formed from the phosphorus oxychloride and phosphates are formed as by-products during the reaction with alcohols to phosphites. During the synthesis of tri-(2-chloroethyl) phosphite by reaction with ethylene oxide, tri-(2-chloroethyl) phosphate is formed as an interfering by-product.

During the synthesis, storage and transport of phosphorus trichloride, care must therefore be taken to exclude air or other oxygen-containing gases as far as possible. The storage of phosphorus trichloride under a slight excess pressure of a dry, oxygen-deficient inert gas is known (Chem. Techn. 33 (1981), vol. 4, page 191). In practice, the synthesis and transport of phosphorus trichloride are also carried out while largely excluding oxygen, if necessary, under the protection of an inert gas, such as nitrogen or carbon dioxide. Nevertheless, during prolonged transport and storage, oxygen has a pronounced effect and there is formation of phosphorus oxychloride. For example, when shipping tank car lots, concentrations of mainly 0.2% to 0.8% phosphorus oxychloride occur.

Because of the high cost of energy and equipment, subsequent or repeated purification by distillation cannot be given consideration.

Decreasing the amount of and stabilizing the phosphorus oxychloride by adsorbents, such as silica gel (Gallus-Olender, I. and Franc, B.; Z. anorgan. allg. Chem. 451 (1979), pages 189-192 and Poland Patent 85 068) are also very disadvantageous because of the large expenditure for equipment, the costs of the adsorbent, the product losses and the disposal of waste. For example, to lower the $POCl_3$ content from 0.78% to 0.07%, calculated as $H_3PO_4$, and to stabilize the phosphorus trichloride, a contact time of 21 days and 10% silica gel, based on the amount of phosphorus trichloride, are required.

SUMMARY OF THE INVENTION

It is an object of the present invention to decrease the technical and economic expense of stabilizing phosphorus trichloride and to reduce the quality losses of the phosphorus trichloride during storage and transport.

The task of the invention consists of providing a method for the stabilization of phosphorus trichloride, during which the formation of phosphorus oxychloride in the phosphorus trichloride is delayed significantly and reduced to a minimum value, which no longer adversely affects further processing.

Pursuant to the invention, this objective is accomplished owing to the fact that one or several derivatives of dithiocarbamic acid are added to the phosphorus trichloride.

DESCRIPTION OF THE PREFERRED EMBODIMENTS

The derivatives of dithiocarbamic acids can be added, for example, as salts and/or esters and/or thiuram sulfides. Very good results are achieved by the addition of alkali salts of dithiocarbamic acids, particularly the sodium or potassium salts of monomethyl-dithiocarbamic acid and/or dimethyl-dithiocarbamic acid and/or diphenyl-dithiocarbamic acid. The formation of phosphorus oxychloride is also reduced to a minimum by the addition of the thiuram sulfides, tetramethyl-thiuram disulfide and/or tetraphenyl-thiuram disulfide and/or N,N'-dimethyl-N,N'-diphenyl-thiuram disulfide.

The derivatives of dithiocarbamic acids are added preferably in concentrations of $10^{-4}\%$ to $10^{-2}\%$, based on the amount of phosphorus trichloride. It is also possible, and frequently appropriate to introduce into the storage tank a derivative of low solubility even in concentrations of more than $10^{-2}\%$, based on the amount of phosphorus trichloride in the respective storage tank, and to leave it there when exchanging the phosphorus trichloride. This derivative deposits, for example, on the bottom and walls of the vessel. When the phosphorus trichloride is exchanged, derivative dissolves once more and again has a stabilizing effect in proportion to the solubility, which depends on the derivative itself and on the temperature. It has been ascertained that the effectiveness of the derivatives is retained over several months, even if the phosphorus trichloride is exchanged frequently.

The amount of stabilizing agent that is to be added to the phosphorus trichloride depends on the intended effect, such as the degree of stabilization and the period of stabilization, as well as on the solubility of the derivative or derivatives of the dithiocarbamic acids in the phosphorus trichloride.

Derivatives with a low solubility in phosphorus trichloride are, for example, sodium dimethyl-dithiocarbamic acid and sodium monomethyl-dithiocarbamic acid.

The derivatives of dithiocarbamic acids exhibit an excellent stabilizing effect in the phosphorus trichloride against gases containing oxygen. The best results are achieved with alkali salts of dithiocarbamic acids. The formation of phosphorus oxychloride in the phosphorus trichloride by the action of air is retarded to such an extent and reduced quantitatively to such a degree, that the phosphorus trichloride practically retains its original quality even after storage or transport for several weeks. Further chemical processing of the phosphorus trichloride can therefore be carried out without problems and does not lead to any losses in yield or reductions in quality of the end products that are to be produced.

The invention will be explained below by means of several examples.

EXAMPLE 1

In each case, 100 g of phosphorus trichloride, freshly prepared under industrial conditions, was filled into 500 ml glass flasks under dry, oxygen deficient argon, then treated with a certain amount of one or several derivatives of the thiocarbamic acids and mixed well. The argon was subsequently replaced by ambient room air and the sample was stored at room temperature in the dark. Immediately before the admission of air and 30 days later, samples were taken and analyzed by infrared spectrophotometry for their phosphorus oxychloride content. In each case, three parallel oxidation experiments were set up and the average values were determined.

For comparison, three were parallel oxidation experiments conducted in the manner described above for each batch of phosphorus trichloride starting material without an additive and the formation of phosphorus oxychloride was investigated. The results are given in Table 1 below.

TABLE 1

| Additive | Amount (mg) | % by Weight of Phosphorus Oxychloride* | | |
|---|---|---|---|---|
| | | 1 | 2 | 3 |
| Tetramethyl-thiuram disulfide | 1 | 0.03 | 1.3 | 0.06 |
| N,N'-Dimethyl-N,N'-diphenyl-thiuram disulfide | 1 | 0.03 | 1.3 | 0.12 |
| Sodium Dimethyl-dithiocarbamate | 1 | 0.03 | 1.3 | 0.04 |
| Sodium Diethyl-dithiocarbamate | 1 | 0.03 | 1.3 | 0.05 |
| Sodium Diphenyl-dithiocarbamate | 1 | 0.03 | 1.3 | 0.05 |
| Sodium Monomethyl-dithiocarbamate | 1 | 0.03 | 1.3 | 0.05 |
| Potassium Monoethyl-dithiocarbamate | 1 | 0.03 | 1.3 | 0.15 |
| Dimethyl-dithiocarbamoyl chloride | 10 | 0.03 | 1.3 | 0.08 |
| Sodium Dimethyl-dithiocarbamate | 0.1 | 0.03 | 1.3 | 0.06 |
| Piperidine N,N-Pentamethylene-dithiocarbamate | 10 | 0.03 | 1.3 | 0.20 |
| Ethyl N,N-dibenzyl-dithiocarbamate | 10 | 0.03 | 1.3 | 0.28 |
| Tetramethylene-thiuram disulfide and sodium dimethyl-dithiocarbamate each | 0.5 | 0.04 | 1.2 | 0.06 |
| Tetramethylene-thiuram disulfide and sodium monomethyl-dithiocarbamate each | 0.5 | 0.04 | 1.2 | 0.05 |
| Tetramethylene-thiuram disulfide and dimethyl-dithiocarbamate chloride each | 0.5 | 0.04 | 1.2 | 0.08 |
| Sodium monomethyl-dithiocarbamate and potassium monoethyl-dithiocarbamate each | 0.5 | 0.04 | 1.2 | 0.06 |
| Sodium monomethyl-dithiocarbamate and ethyl N,N-dibenzyl-dithiocarbamate each | 0.5 | 0.04 | 1.2 | 0.07 |
| Dimethyl-dithiocarbamoyl chloride and piperidine N,N-pentamethylene-dithiocarbamate each | 0.5 | 0.04 | 1.2 | 0.12 |

*1 — before the action of oxygen
2 — after the action of oxygen without additive
3 — after the action of oxygen with additive

EXAMPLE 2

To a gas wash bottle, equipped with reflux condenser and a glass frit for dispersing gas, 100 ml of phosphorus trichloride with a phosphorus oxychloride content of 0.03% were added, mixed with the derivative or the mixture of derivatives and treated uniformly for one hour with 10 l of oxygen gas. Subsequently, the phosphorus oxychloride content was checked by infrared spectrophotometry. The results obtained are compared with a control without additives in the following Table 2.

TABLE 2

| Additive | Amount (mg) | % by Weight of Phosphorous Oxychloride |
|---|---|---|
| None | — | 22.5 |
| Sodium monomethyl-dithiocarbamate | 10 | 8.5 |
| Sodium dimethyl-dithiocarbamate | 10 | 6.4 |
| Tetramethyl-thiuram disulfide | 10 | 5.2 |
| Sodium dimethyl-dithiocarbamate and tetramethyl-thiuram disulfide each | 5 | 6.0 |

EXAMPLE 3

In each case, 100 g of freshly prepared, technical-grade phosphorus trichloride was treated with two derivatives and investigated in the manner described in Example 1. In deviation from that method, however, the phosphorus oxychloride content was checked already after 10 days. Subsequently, the phosphorus trichloride was carefully separated from the additive, replaced by new material, air was blown into it and it was checked once again for phosphorus oxychloride after a further 10 days. The exchange and the analysis were repeated twice more. The results are given in the following Table 3.

TABLE 3

| Additive | Amount (mg) | % by Weight of Phosphorus Oxychloride** | | | | |
|---|---|---|---|---|---|---|
| | | 1 | 2 | 3 | 4 | 5 |
| None | — | 0.03 | 1.64 | 0.28 | 1.3 | 0.9 |
| Sodium Dimethyl-dithiocarbamate | 10 | 0.03 | 0.05 | 0.03 | 0.05 | 0.04 |
| Sodium Monomethyl-dithiocarbamate | 10 | 0.03 | 0.08 | 0.03 | 0.05 | 0.05 |

**1 — before the action of oxygen
2 to 5 — for the action of oxygen after 10, 20, 30 and 40 days

I claim:

1. A method of stabilizing phosphorus trichloride, comprising adding at least one derivative of dithiocarbamic acids to a composition consisting essentially of phosphorus trichloride.

2. The method of claim 1, wherein said derivatives of dithiocarbamic acids are selected from the group consisting of salts, esters and thiuram sulfides of dithiocarbamic acids, and mixtures thereof.

3. The method of claim 2, wherein said salts of dithiocarbamic acids comprise alkali salts selected from the group consisting of sodium and potassium salts of dithiocarbamic acids.

4. The method of claim 3, wherein said alkali salts are selected from the group consisting of sodium or potassium salts of monomethyldithiocarbamic acid, dimethyl-dithiocarbamic acid and diphenyl-dithiocarbamic acid, and mixtures thereof.

5. The method of claim 2, wherein said thiuram sulfides are selected from the group consisting of tetramethyl-thiuram disulfide, tetraphenyl-thiuram disulfide, N,N'-dimethyl-N,N'-diphenyl-thiuram sulfide, and mixtures thereof.

6. The method of claim 1, wherein said derivatives of dithiocarbamic acids are added in a total concentration of $10^{-4}\%$ to $10^{-2}\%$ by weight, based on the amount of phosphorus trichloride.

7. The method of claim 1, wherein said derivatives of dithiocarbamic acid are substantially insoluble in phosphorus trichloride and are added in a total concentration of more than $10^{-2}\%$ by weight, based on the amount of phosphorus trichloride.

8. A composition consisting essentially of phosphorus trichloride and at least one derivative of dithiocarbamic acids as a stabilizing agent.

9. The composition of claim 8, wherein said derivatives of dithiocarbamic acids are selected from the group consisting of salts, esters and thiuram sulfides of dithiocarbamic acids, and mixtures thereof.

10. The composition of claim 9, wherein said salts of dithiocarbamic acids comprise alkali salts selected from the group consisting of sodium and potassium salts of dithiocarbamic acids.

11. The composition of claim 10, wherein said alkali salts are selected from the group consisting of sodium and potassium salts of monomethyl-dithiocarbamic acid, dimethyl-dithiocarbamic acid, diphenyl-dithiocarbamic acid, and mixtures thereof.

12. The composition of claim 9, wherein said thiuram sulfides are selected from the group consisting of tetramethyl-thiuram disulfide, tetraphenyl-thiuram disulfide, N,N'-dimethyl-N,N'-diphenyl-thiuram sulfide, and mixtures thereof.

13. The composition of claim 8, wherein said derivatives of dithiocarbamic acids are present in a total concentration of $10^{-4}\%$ to $10^{-2}\%$ by weight, based on the amount of phosphorus trichloride.

14. The composition of claim 8, wherein said derivatives of dithiocarbamic acids are substantially insoluble in phosphorus trichloride and are present in a total concentration of more than $10^{-2}\%$ by weight, based on the amount of phosphorus trichloride.

* * * * *